March 6, 1962     A. J. PECKJIAN     3,024,396
AUTOMATIC CONTROL OF MACHINE TOOLS Filed Nov. 27, 1957     3 Sheets-Sheet 1

ARNOLD J. PECKJIAN
INVENTOR.

BY
ATTORNEY

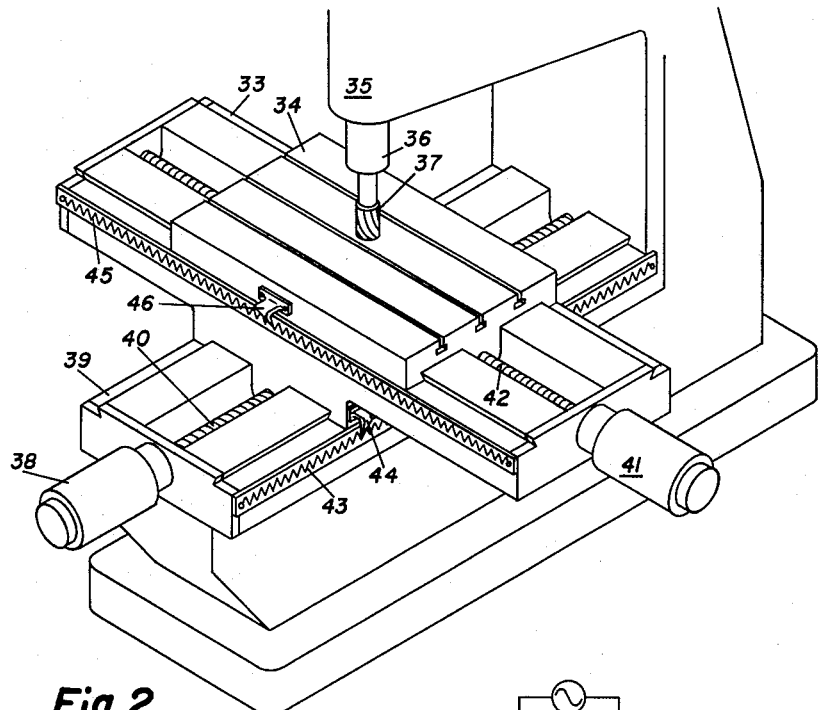
Fig.2
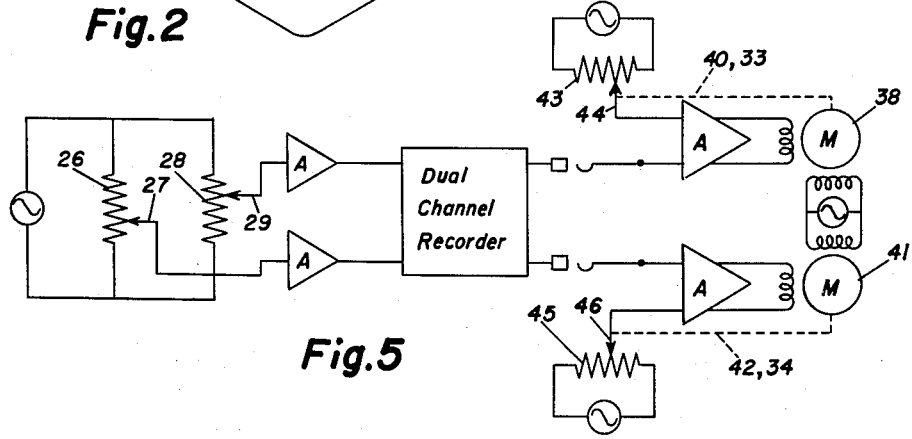
Fig.5
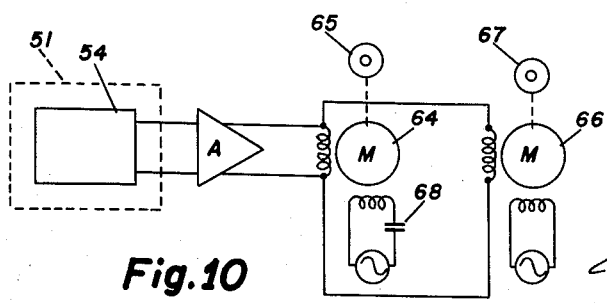
Fig.10
ARNOLD J. PECKJIAN
INVENTOR.
ATTORNEY March 6, 1962  A. J. PECKJIAN  3,024,396
AUTOMATIC CONTROL OF MACHINE TOOLS
Filed Nov. 27, 1957  3 Sheets-Sheet 3
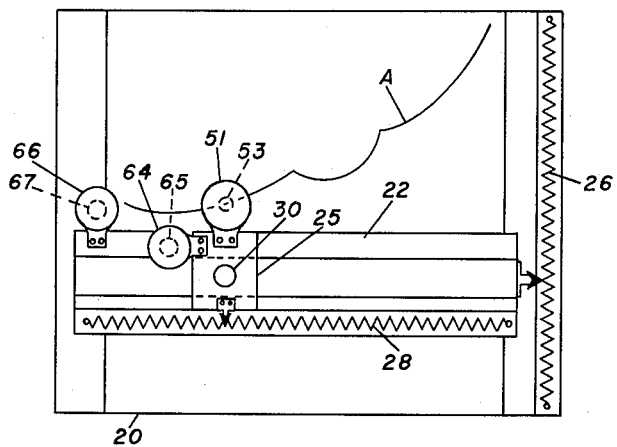
Fig.9
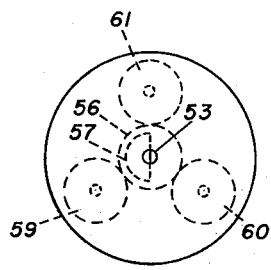
Fig.7
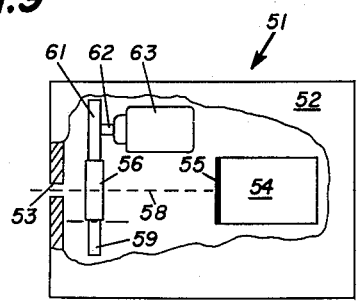
Fig.6
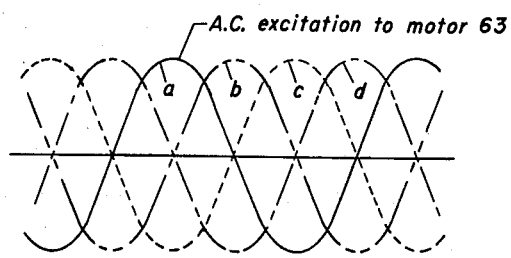
Fig.8
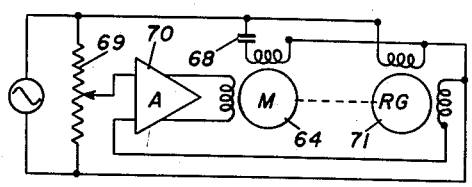
Fig.11
ARNOLD J. PECKJIAN
INVENTOR.
ATTORNEY United States Patent Office 3,024,396
Patented Mar. 6, 1962

3,024,396
AUTOMATIC CONTROL OF MACHINE TOOLS
Arnold John Peckjian, 142 Bridge St., Drexel Hill, Pa.
Filed Nov. 27, 1957, Ser. No. 699,329
19 Claims. (Cl. 318—162)

This invention relates to machine tools and more particularly to means for automatically controlling a milling machine, lathe or the like.

It is an object of the present invention to provide means for machining an object to a contour as defined by an accurate drawing of the desired outline or other pictorial representation thereof.

It is a further object to provide servo means for positioning the workpiece relative to the associated cutter, which servo means are controlled by signals generated in response to movement of a line tracking device associated with said drawing or other pictorial representation.

It is another object of the invention to provide means for recording signals generated in response to movement of the line tracking device for the duplication of the machining operation on machines disassociated from said tracking device.

It is another object of the invention to provide the tracking device with optical sensing means for causing the device to accurately follow the line drawing.

It is a further object to provide a manually operable line tracking device with the aforementioned optical sensing means to override the manual control of the device to provide accurate tracking of the line.

A still further object is to provide a line tracking device with constant speed driving means for positioning the device along one coordinate, the device being manually operable along the other coordinate or utilizing the aforementioned optical sensing means to effect a drive along the other coordinate to automatically track the line drawing.

Other objects of the invention, as well as the advantages thereof, will become apparent from the following description when considered in conjunction with the accompanying drawings in which:

FIG. 2 is a perspective view of a milling machine whose work-piece to cutter movements are automatically controlled by the tracking device shown in FIG. 1;

FIG. 5 is a diagram of an electrical circuit for recording the output voltages of the tracking device and of the electrical circuit for controlling the work-piece to cutter movements during playback;

FIG. 6 is a side view partly in section of the optical sensing head of the present invention;

FIG. 7 is an end view thereof;

FIG. 8 shows the phase relationship of the current transduced by the phototube of the optical sensing head for different "off-center" positions thereof relative to the line being followed;

FIG. 9 is a plan view of the line tracking device of FIG. 1 modified to incorporate the optical sensing head and servo motors controlled thereby;

FIG. 10 is a diagram of an electrical control circuit for the apparatus of FIG. 9; and FIG. 11 is a diagram of an electrical circuit for the constant speed control of the apparatus of FIG. 9.

Figure 1:
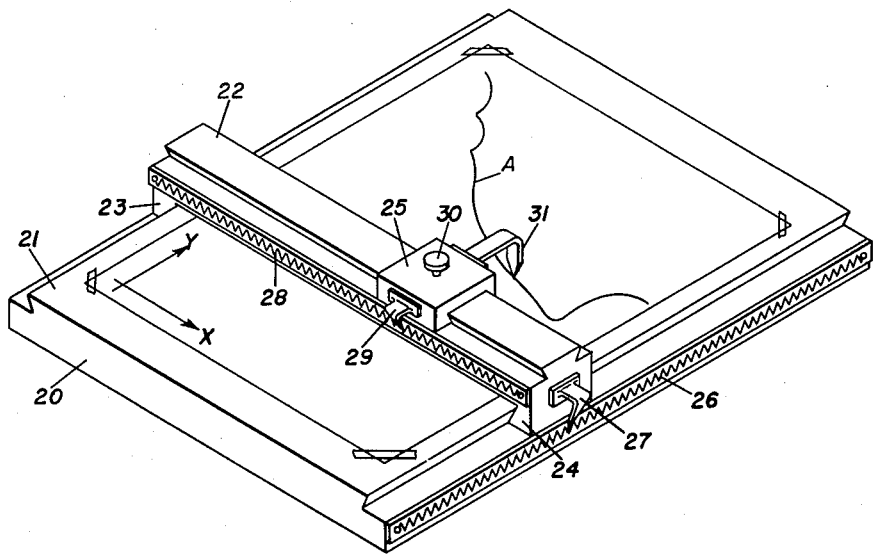
FIG. 1 is a perspective view of the manual line tracking device of the present invention.

As shown in FIG. 1, the tracking device consists of a base 20, the top surface 21 of which is smooth and flat and upon which is laid out a line drawing, pattern or curve, or upon which a photograph or line drawing is placed and secured by any suitable means. It is this line or curve A to which the workpiece is to be automatically machined.

A vertical slide assembly 22 having downwardly extending end portions 23 and 24 is slidably supported by the base 20 and in turn slidably supports a horizontal slide assembly 25. Motion of the horizontal slide assembly 25 along the vertical slide assembly 22 is thereby perpendicular to the up and down motion of the vertical slide assembly 25 relative to the base 20.

Mounted upon the base 20 is a slide wire potentiometer 26, the wiper 27 for which is mounted upon the end portion 24 of the vertical slide assembly 22. A similar slide wire potentiometer 28 is mounted upon one edge of the vertical slide assembly 22 while its wiper 29 is mounted upon the horizontal slide assembly 25. Although not shown in detail, it is to be understood that the slide wire potentiometers, as well as their associated wipers, are insulated from the particular structure upon which they are mounted.

A knob 30 and a pointer 31 are provided on the horizontal slide assembly 25 to enable one to manually trace or follow the curve, pattern or line drawing, and in so doing to resolve the same into rectangular coordinates.

Referring now to FIG. 2, there is shown a milling machine consisting of a cross slide 33, a work table 34 and a spindle head 35 provided with a spindle 36 upon which is mounted a cutter 37. A servo motor 38 is mounted on the base 39 of the milling machine and is adapted to drive a lead screw 40, the rotation of which displaces the cross slide 33. Similarly, a servo motor 41 is mounted on the cross-slide 33 and is adapted to drive a lead screw 42, the rotation of which causes a lateral displacement of the work table 34.

Mounted upon the base 39 is a slide wire potentiometer 43, which is identical with the slide wire potentiometer 26 of the tracking device and which is provided with a wiper 44 mounted upon the cross-slide 33. A slide wire potentiometer 45, which is identical with the slide wire potentiometer 28 of the tracking device, is mounted upon a side portion of the cross-slide 33 and is provided with a wiper 46 in turn mounted upon the work table 34.

Figure 3:
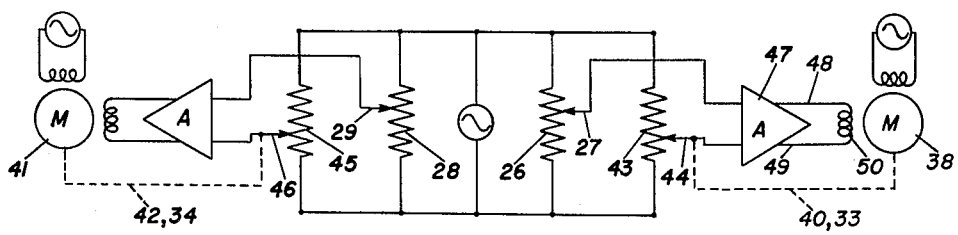
FIG. 3 is a diagram of an electrical control circuit for the apparatus of FIGS. 1 and 2.

FIG. 3 shows an electrical circuit for controlling the operation of the servo motors 38 and 41 and hence movement of the cross-slide 33 and work table 34 in response to movements of the line tracking device when following a curve or line drawing. As shown, the potentiometers 26 and 43 with their respective wipers 27 and 44 are connected in the manner of a conventional bridge circuit whereby any difference in the position between the wipers 27 and 44 with their associated potentiometers is detected and the error signal resulting from such position difference is fed to an amplifier 47. This signal is amplified and fed through conductors 48 and 49 to a control winding 50 of the servo motor 38. The phase or polarity of the amplified error signal is such as to cause operation of the servo motor 38, and through the lead screw 40, movement of the cross slide 33 and the wiper 44 mounted thereon in such direction as to balance the bridge circuit and produce a null. Any movement of the vertical slide assembly 22 in following the curve A will produce an unbalance in the bridge circuit resulting in actuation of the servo motor 38 to produce the same movement of the cross-slide 33 of the milling machine.

An identical system for the horizontal coordinate, i.e., a bridge circuit incorporating the potentiometers 28 and 45 with their respective wipers 29 and 46, and an associated amplifier, all as shown in FIG. 3, causes operation of the servo motor 41 and hence horizontal movement of the work table 34 in response to movement of the horizontal slide assembly 25 relative to the vertical slide assembly 22. Although the potentiometers may be so arranged in the bridge circuits that movements of the work table will parallel those of the pointer 31, by proper arrangement, movement of the work table may be made exactly opposite to that of the pointer 31 and the work-piece mounted on the work table will thereby be cut to a contour as defined by the curve A.

Figure 4:
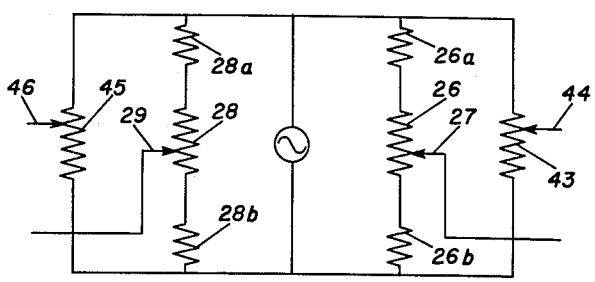
FIG. 4 shows a modification to the control circuit of FIG. 3.

If desired, the work-piece to cutter movements may be scaled up or down relative to the movements of the line tracking device whereby the work-piece may be machined to a size larger or smaller than that of the line drawing. Means for accomplishing such scale effect are shown in FIG. 4. As shown, matched resistors 26a and 26b are inserted in the bridge circuit on either side of the control potentiometer 26, while matched resistors 28a and 28b, identical to 26a and 26b, are inserted in the other bridge circuit on either side of the control potentiometer 28. It is apparent therefrom that null conditions exist in both bridge circuits when the wipers are centered, but that a displacement of the wiper 27 or 29 will be followed up by a lesser displacement of the wipers 44 and 46 respectively. For example, if the resistance of the resistors 26a, 26b, 28a and 28b each be one-half the resistance of the potentiometer 26 or 28, then the follow-up displacement of the wipers 44 and 46 will be exactly one-half the displacement of the wipers 27 and 29 respectively.

By inserting matched resistors on either side of the potentiometers 43 and 45, displacement of the wipers 27 and 29 will be followed up by a greater displacement of the wipers 44 and 46 respectively. Thus, means are provided for machining the work-piece to any desired scale relative to that of the line drawing.

If desired, a dual channel recorder may be connected to the outputs of the potentiometers 26 and 28 as shown in FIG. 5. By such means, the voltages corresponding to the position of the pointer 31 in the X and Y axes when tracking the curve A are recorded on separate channels and are available for future use and/or with machines disassociated from the tracking device. In such use, the output voltage of each channel during playback is fed to separate amplifiers as shown, along with the output voltage from the potentiometer 43 or 45 as the case may be. The difference in the two voltages fed to each of the respective amplifiers causes actuation of the servo motors 38 and 41 to drive the cross-slide 33 and the work table 34 in directions to produce a null in the manner more fully explained hereinabove with reference to FIG. 3.

Referring now to FIGS. 6 and 7, there is shown an optical sensing head 51 adapted for use with the tracking device of the present invention. As shown, the optical sensing head 51 consists of a cylindrical housing 52 closed at one end and provided with an aperture 53 centrally located in the other end. Contained within the housing 52 is a photo sensing element 54 having its photo sensitive area 55 facing the aperture 53, while positioned between the aperture 53 and the photo sensing element 54 is a rotatably mounted shutter 56 having a cutout 57 as shown in FIG. 7. The axis of rotation 58 of the shutter 56 is aligned with that of the aperture and the photo-sensing element 54. The shutter 56 is provided on the edge thereof with gear teeth, not shown for the sake of clarity, and is rotatably mounted by means of idler gears 59 and 60 and a drive gear 61 provided on the end of the drive shaft 62 of a self-orienting synchronous motor 63.

The characteristics of a self-orienting synchronous motor are that for a constant mechanical load, the shaft of the motor is always at the same angular position at a given point in its A.C. excitations' electrical cycle. For example, if the A.C. excitation to the self-orienting synchronous motor is 60 c.p.s., the shaft of the motor will rotate at 60 revolutions per second, and the angular position of the shaft at the instant of maximum positive amplitude of the excitation will always be the same.

Thus the motor shaft is not only locked to the A.C. excitations' frequency insofar as its speed is concerned, but is locked to the instantaneous point of the A.C. excitations' cycle insofar as its angular position is concerned. The self-orienting synchronous motor 63 is geared 1:1 with the shutter 56 so that this locking characteristic is passed on to the shutter.

When a curve, which is dark in contrast with the surrounding medium on which it is drawn, is brought up close to the aperture 53 of the optical sensing head 51 in such a position as to be centered vertically and horizontally, a cross-section of the cone of light coming through the aperture 53 will be a uniformly illuminated circle. However, if a curve is brought up close to the aperture 53 to a position below the aperture, then a cross-section of the cone of the light coming through the aperture will not be a uniformly illuminated circle, but instead, a circle having a darker area on top as compared to its lower area. The interrupting action of the shutter 56 will cause a sinusoidal variation in the light impinging on the photo-sensing element 54. In addition, due to the locking characteristic of the self-orienting synchronous motor 63, the frequency of the sinusoidal variations in light on the photo-sensing element 54 will be identical to the frequency of the A.C. excitation of the self-orienting synchronous motor 63. Furthermore, the phase of the sinusoidal variations in light will be locked with respect to the phase of the A.C. excitation to the self-orienting synchronous motor 63 for a given direction of error in curve location with respect to the aperture 53.

Of course, the photo-sensing element 54 transduces the sinusoidal variations in light impinging thereon to an A.C. error signal. The frequency of this error signal will therefore be the same as the frequency of the A.C. excitation to the self-orienting synchronous motor 63 and the phase of this error signal for a given direction of error will always be fixed with respect to the phase of the A.C. excitation to the self-orienting synchronous motor 63. FIG. 8 shows the phase relationship of A.C. excitation and error signal for various positions of the line A relative to the aperture 53; the curves a, b, c and d being respectively those error signals transduced by the photo-sensing element when the line A is to the left of, above, to the right of, and below the aperture 53.

By mounting the optical sensing head 51 on the horizontal slide assembly 25 as shown in FIG. 9, the signals from the photo-sensing element 54 may be utilized to control servo motors to thereby position the horizontal and vertical slide assemblies 25 and 22. As shown in FIG. 9, the optical sensing head 51 is mounted on the horizontal slide assembly 25 with its aperture 53 in the position previously occupied by the pointer 31 of the FIG. 1 apparatus. Also mounted on the horizontal slide assembly 25 is a two-phase servo motor 64 which is geared to the vertical slide assembly 22 by means of a friction wheel 65. Thus, operation of the servo motor 64 causes horizontal movement of the horizontal slide assembly 25. Similarly, a two-phase servo motor 66 is mounted on one end of the vertical slide assembly 22 and is geared to the base 20 by means of a friction wheel 67 whereby operation of the servo motor 66 causes up and down movement of the vertical slide assembly 22. The servo motors 64 and 66 are each provided with rate generators, the purpose for which will become apparent hereinbelow.

The means for controlling the two-phase servo motors 64 and 66 in response to signals from the photo sensing element 54 of the optical sensing head 51 are shown in FIG. 10. As shown, the reference windings of the servo motors 66 and 64 are excited by voltages which are in phase with the A.C. power and 90° out of phase with the A.C. power, respectively. This is shown schematically by the condenser 68 inserted in series with the reference winding of the servo motor 64. The error signal is of course of a fixed phase relationship depending upon the direction of error of the curve A with respect to the aperture 53 of the optical sensing head 51. This error signal is amplified and fed to the control windings of both servo motors 64 and 66 in parallel. Since it is characteristic of a two-phase servo motor not to respond to a voltage on its control winding either in phase or 180° out of phase with the voltage across its reference winding, by proper selection and setting of phase relationships the servo motor 66 will respond to vertical errors or vertical components of errors and the servo motor 64 will respond to horizontal errors or horizontal components of errors and produce restoring torques so as to drive to a null whereby the aperture 53 of the optical sensing head 51 is positioned directly over the center of the curve A. Thus if one manually were to guide the horizontal slide assembly 25 in the direction of the curve A by means of the knob 30 mounted thereon, the restoring torques of the servo motors 64 and 66 would automatically keep the aperture 53 over the center of the curve A being followed.

Referring again to FIG. 8, it is seen that when the curve A is to the left or to the right of the aperture 53, the A.C. error signal transduced by the photo-sensing element 54 is in phase and 180° out of phase, respectively with the A.C. excitation to the self-orienting synchronous motor 63. Since the A.C. excitation to the motor 63 is of the same phase as that to the reference winding of the two-phase servo motor 66, the servo motor 66 will not respond to such error signals from the photo-sensing element 54. However, since the reference winding of the two-phase servo motor 64 is excited by a voltage which is 90° out of phase with that of the synchronous motor 63, such error signals from the photo-sensing element 54 will be 90° or 270° out of phase with the voltage across the reference winding of the servo motor 64. Hence, the servo motor 64 will respond to these error signals to drive the horizontal slide assembly 25 to a position in which the aperture 53 is directly over the curve or line A.

Similarly, it is seen that when the curve or line A is above or below the aperture 53, the A.C. error signal is 90° and 270° out of phase, respectively with the A.C. excitation of the self-orienting synchronous motor 63. Hence, the servo motor 64 will not respond to these error signals to its control winding because they are either in phase or 180° out of phase with the voltage across its reference winding, while the servo motor 66 will respond to such error signals to drive the vertical slide assembly 22 to a position in which the aperture 53 is directly over the curve or line A.

Accordingly, there is provided a system for manually guiding the horizontal slide assembly 25 in the general direction of the curve A while the optical follower system constrains the horizontal and vertical slide assemblies 25 and 22 to move in such manner as for the aperture 53 to exactly follow the curve A. Thus, the position of the slide assemblies at any point will resolve the curve A into its coordinates which are then followed up by the milling machine in the manner described hereinabove with reference to FIG. 3.

Further modification of the apparatus shown in FIG. 9 may comprise motor means for driving either the horizontal slide assembly 25 or the vertical slide assembly 22 while the position of the other slide assembly is automatically controlled by the optical sensing head 51 in the manner just described.

FIG. 11 shows an electrical circuit for the constant speed control of the servo motor 64 of FIGS. 9 and 10, the components of which circuit comprise an input potentiometer 69, an amplifier 70, the servo motor 64, and a rate generator 71 driven by the servo motor 64. As can be seen from the diagram, the circuit is such that the difference in voltage across the input potentiometer 69 and the voltage output from the rate generator 71 is fed to the amplifier 70 and thence to the control winding of the two-phase servo motor 64. Should the voltage across the input potentiometer 69 be greater than that produced by the rate generator 71, the servo motor 64 will increase its speed until those two voltages are substantially equal. Similarly, should the voltage across the input potentiometer 69 be less than that produced by the rate generator 71, the servo motor 64 will decrease its speed until those two voltages are substantially equal.

Further, should the voltage across the input potentiometer 69 be changed, the voltage output of the rate generator 71 would then be considerably different from the voltage across the input potentiometer 69 and this difference when amplified causes the servo motor 64 to increase or decrease its speed depending upon the direction of error, until these two voltages are again substantially equal. Hence, means are provided whereby the speed of the servo motor 64 is maintained constant for any given position of the wiper of the input potentiometer 69 and further whereby this constant speed may be changed to a different constant speed by changing the position of the wiper of the input potentiometer 69.

By disconnecting the control winding of the servo motor 64 from the amplifier of FIG. 10 and connecting that control winding to the amplifier 70 of FIG. 11 and connecting the control winding of the rate generator 71 to the amplifier 70 of FIG. 11, means are provided for driving the horizontal slide assembly 25 at a constant speed. In such instance, the vertical slide assembly 22 may be manually guided to cause the pointer 31 to follow the curve A, or the vertical slide assembly 22 may be automatically positioned by the optical sensing head 51 in the manner described with reference to FIGS. 9 and 10.

Although not shown, it is to be understood that the control winding of the servo motor 66 of FIGS. 9 and 10 may be disconnected from the amplifier of FIG. 10 and connected along with its rate generator to the amplifier 70 of FIG. 11, in which instance the servo motor 64 would remain connected to the amplifier of FIG. 10 whereby means are provided for driving the vertical slide assembly 22 at a constant speed while the horizontal slide assembly 25 is automatically positioned by the optical sensing head 51 in the manner previously described.

For convenience of operation, gang switches may be provided for connecting both servo motors 64 and 66 to the amplifier of FIG. 10 as shown therein, for alternatively connecting the servo motor 64 to the amplifier of FIG. 10 and to that of FIG. 11 and/or for alternatively connecting the servo motor 66 to the amplifier of FIG. 10 and to that of FIG. 11. By observing the proper phase relationships of input signals as governed by reference winding excitations, it is thereby possible to provide a constant speed drive for one slide assembly in either direction while automatically positioning the other slide assembly by the optical sensing means to accurately track the curve A. The positions of the slide assemblies 22 and 25 are followed up by the milling machine in the manner described hereinabove with reference to FIG. 3.

Although shown and described in what is believed to be the most practical and preferred embodiments, it is apparent that departures therefrom will suggest themselves to those skilled in the art and may be made without departing from the spirit and scope of the invention. I therefore do not wish to restrict myself to the particular forms of construction illustrated and described, but desire to avail myself of all modifications that may fall within the scope of the appended claims.

Having thus described my invention, what I claim is:

1. In apparatus for machining an object to a contour as defined by an outline thereof, means for following said outline to resolve it into its coordinates, means for generating signals proportional to said coordinates, and means responsive to said signals for effecting relative movement between the object and its machining tool.

2. In apparatus for machining an object to a contour as defined by a line drawing thereof, manually operable means for following the line drawing to resolve it into its coordinates, means for generating signals proportional to said coordinates, and means responsive to said signals for effecting relative movement between the object and its machining tool.

3. The apparatus as set forth in claim 2 and including motor means for positioning said manually operable means, and optical sensing means for controlling said motor means to override the manual control of said manually operable means.

4. The apparatus of claim 3 wherein said optical sensing means comprise means for generating signals of phase indicative of the direction of offcenter position of said line following means relative to the line drawing.

5. The apparatus of claim 1 and including means for positioning said outline following means along a first axis, and optical sensing means for controlling the positioning of said outline following means along an axis at right angles to said first axis.

6. The apparatus of claim 5 wherein said means for positioning said outline following means along said first axis comprise constant speed motor means.

7. In apparatus for machining an object to a contour as defined by a line drawing thereof, the combination of a base for supporting said line drawing, a first slide member carried by said base and adapted for reciprocative movement in one direction relative to said base, a second slide member carried by said first slide member and adapted for movement relative to said first slide member and at right angles to the direction of movement of said first slide member, means for generating signals proportional to the position of said first slide member relative to said base and proportional to the position of said second slide member relative to said first slide member, a machine tool provided with a base having a cross-slide adapted for reciprocative movement relative to said base, a work table carried by said cross-slide and adapted for movement relative to said cross-slide and at right angles to the movement of said cross-slide, motor means for positioning said work table relative to said cross-slide, motor means for positioning said cross-slide relative to said base, means for generating signals proportional to the position of said cross-slide relative to said base and proportional to the position of said work table relative to said cross-slide, and means for comparing the signals generated by said second mentioned signal generating means with the signals generated by said first mentioned signal generating means, the difference in the signals so compared causing operation of said motor means.

8. The apparatus set forth in claim 7 and including means carried by said second slide member for scanning a finite portion of said line and including means for generating signals in response to off-center positions of said scanning means relative to said line, motor means carried by said first slide member and adapted to position said first slide member relative to said base, and motor means carried by said second slide member and adapted to position said second slide member relative to said first slide member, at least one of said motor means being controlled in response to signals generated by said scanning means.

9. The apparatus set forth in claim 8 wherein at least one of said motor means comprises a constant speed motor.

10. The apparatus set forth in claim 8 wherein the motor means carried by said first slide member are controlled by signals generated by said scanning means and the motor means carried by said second slide member comprise a constant speed motor.

11. The apparatus set forth in claim 8 wherein the motor means carried by said second slide member are controlled by signals generated by said scanning means and the motor means carried by said first slide member comprise a constant speed motor.

12. The apparatus set forth in claim 8 and including constant speed controlling means for at least one of said motor means.

13. In apparatus for machining an object to a contour as defined by a line drawing of the desired outline: means for following the line drawing comprising a support for said drawing, a first member carried by said support and adapted for reciprocative movement in one direction, a second member carried by said first member and adapted for reciprocative movement in a direction at right angles to that of said first member, and means provided on said second member for tracking the line drawing; means for generating signals proportional to the position of said first member relative to said support and said second member relative to said first member; and means responsive to said signals for effecting movement of the object to be machined.

14. In a line tracking device, a base for supporting a line drawing, a first slide member carried by said base for reciprocative movement relative thereto in one direction, a second slide member carried by said first slide member for reciprocative movement relative thereto at right angles to the direction of movement of said first slide member, means provided on said second slide member for the manual control thereof, means carried by said second slide member for scanning a finite portion of said line and including means for generating signals in response to off-center positions of said scanning means relative to said line, means associated with said slide members for generating signals proportional to the position of said scanning means relative to said base, motor means adapted to position said first slide member relative to said base, and motor means adapted to position said second slide member relative to said first slide member, at least one of said motor means being controlled in response to signals generated by said scanning means.

15. The apparatus set forth in claim 14 wherein at least one of said motor means comprises a constant speed motor.

16. The apparatus set forth in claim 15 and including means for changing the speed of said constant speed motor.

17. In a line tracking device, a base for supporting a line drawing, a first member carried by said base for reciprocative movement relative thereto, a second member carried by said first member for sliding movement therealong, means provided on said second member for the manual control thereof, means carried by said second member for scanning a finite portion of said line and including means for generating signals in response to off-center positions of said scanning means relative to said line, means associated with said first and said second members for generating signals proportional to the position of said scanning means relative to said base, motor means adapted to position said first member relative to said base, and motor means adapted to position said second member relative to said first member, at least one of said motor means being controlled in response to signals generated by said scanning means.

18. In a line tracking device, a base for supporting a line drawing, a first member carried by said base for reciprocative movement relative thereto, a second member carried by said first member for sliding movement therealong, means carried by said second member for scanning a finite portion of said line and including means for generating signals in response to off-center positions of said scanning means relative to said line, said signal generating means including a shutter driven by a self-orienting synchronous motor and photo sensing means adapted to transduce the variations in light impinging thereon to an A.C. signal, a two-phase servo motor adapted to position said first member relative to said base, a two-phase servo motor adapted to position said second member relative to said first member, the reference winding of one of said servo motors being in phase and the reference winding of the other of said servo motors being 90° out of phase with the A.C. excitation of said synchronous motor, and means for applying the A.C. signal transduced by said photo sensing means to the control winding of at least one of said servo motors.

19. In a line tracking device, a base for supporting a line drawing, a first slide member carried by said base for reciprocative movement relative thereto in one direction, a second slide member carried by said first slide member for reciprocative movement relative thereto at right angles to the direction of movement of said first slide member, means carried by said second slide member for scanning a finite portion of said line and including means for generating signals in response to off-center positions of said scanning means relative to said line, said signal generating means including a photo sensing element and a shutter adapted to vary the light impinging on said photo sensing element, said photo sensing element transducing the variations in light impinging thereon to an A.C. signal, a self-orienting synchronous motor adapted to drive said shutter, a two-phase servo motor adapted to position said first slide member relative to said base, a two-phase servo motor adapted to position said second slide member relative to said first slide member, the reference winding of one of said servo motors being in phase and the reference winding of the other of said servo motors being 90° out of phase with the A.C. excitation of said synchronous motor, and means for applying the A.C. signal transduced by said photo sensing element to the control winding of at least one of said servo motors.

References Cited in the file of this patent

UNITED STATES PATENTS

| | | | |
|---|---|---|---|
| 2,116,593 | Bouvier et al. | May 10, | 1938 |
| 2,313,272 | Schock et al. | Mar. 9, | 1943 |
| 2,331,337 | Meyer | Oct. 12, | 1943 |
| 2,499,178 | Berry et al. | Feb. 28, | 1950 |
| 2,557,824 | Hornfeck | June 19, | 1951 |
| 2,574,104 | Ireland | Nov. 6, | 1951 |
| 2,692,358 | Wild | Oct. 19, | 1954 |
| 2,698,217 | Ford | Dec. 28, | 1954 |
| 2,704,012 | Trinkle | Mar. 15, | 1955 |
| 2,723,845 | Przybylski et al. | Nov. 15, | 1955 |
| 2,843,024 | Armitage et al. | July 15, | 1958 |
| 2,851,643 | Limberger | Sept. 9, | 1958 |